INVENTOR.
Heinrich Johann Oelkers
BY

2,801,748

METHOD OF DISTRIBUTING LAUNDRY FOR PROCESSING

Heinrich Johann Oelkers, Bremen, Germany

Application March 31, 1952, Serial No. 279,642

Claims priority, application Germany October 31, 1951

2 Claims. (Cl. 209—122)

The conveyor belt production system has been suggested and adopted for various places of production. Also, in commercial laundries endless belts, conveyors, etc. have been employed for transporting the laundry to be washed. Such belts, conveyors, etc. have particularly been used for transporting the laundry from one sorting place where the laundry articles are marked to a place of distribution whereupon the laundry articles are moved to the washing machines mostly by means of small vehicles. It has also been suggested to use endless belts instead of said small vehicles. However, the transporting of the laundry was always effected only from one machine to another.

In contrast thereto, with conveyor belt production systems as used, for instance, in the automobile manufacturing process, the conveyor belt passes by the individual manufacturing stations, and the product, without being taken off the belt is, after each processing step moved from one working station to another working station.

Commercial laundries of great capacity have always endeavored to mechanize the passage of the laundry following the washing and centrifuging steps and to ready the laundry by means of a conveyor belt system in timed steps, to pack the laundry and to transport the same in complete lots to the delivery station. Such a conveyor belt system for washed and completely processed laundry, i. e. dried, mangled, machined, hand-pressed, stretched, starched, shaped and patched laundry, failed heretofore in view of the multiplicity of the individual types of articles occurring in commercial laundries. The solution of the problem primarily failed for the following reasons:

(a) The laundry lots received from households, enterprises, individuals, industrial establishments, hospitals, etc. comprise the most different types of laundry articles which, in turn, have to be sub-divided according to the respective materials and types of fabrics such as cotton, linen, silk, rayon, wool, etc., and also according to whether they are color-fast or not color-fast. A further sub-division has to be made as to good and damaged, clean and soiled laundry. These different types of laundry articles require different treatment methods which, in turn, makes difficult uniformly readying and particularly sorting the laundry.

(b) It has been attempted to mark the laundry with various markings such as numbers, pins, marker threads, and so on and to take the laundry off the conveyor belt accordingly. This, however, failed inasmuch as such conveyor belts, in order to have satisfactory efficiency, have to move at such a speed that the worker cannot take off the laundry articles quickly enough and cannot spot the marking fast enough in order to deposit the respective article properly.

It is, therefore, an object of this invention to provide a simplified and economic method of distributing and sorting of washed and dried laundry articles and of transporting the processed laundry to the packaging tables.

It is also an object of this invention to provide simplified transporting means including a conveyor belt system, which will make it possible fast and economically to pick up the laundry at the washing machines, sort it according to the various lots and to transport it to the packaging tables for ultimate delivery.

It is a still further object of this invention to provide a conveyor belt system for commercial laundries adapted to transport the laundry articles in spaced arrangement and in a continuous process to move the articles to be processed by the various processing stations while picking up processed laundry articles and to move the same to other processing stations and/or further, to the ultimate sorting and packaging tables.

These and other objects and advantages of the invention will appear more clearly from the following specification in connection with the accompanying drawings in which:

Fig. 1 diagrammatically represents a top view of the entire assembly showing the conveyor system for passing the individual articles by the various processing stations;

*General arrangement*

Figure 1:
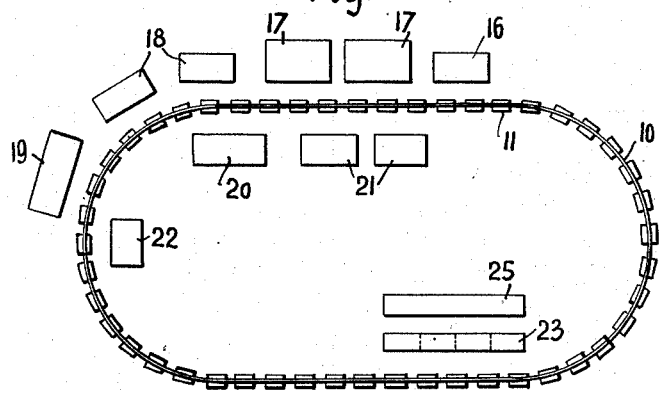
Figure 2:
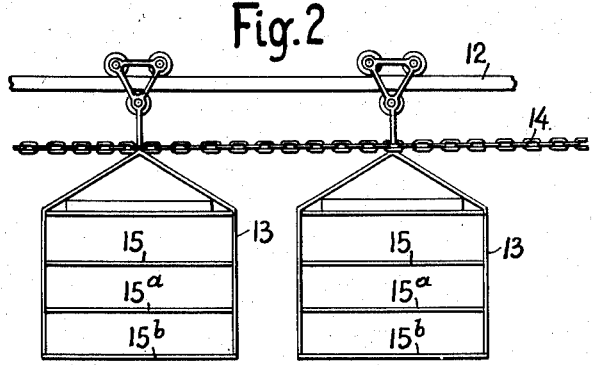
Fig. 2 illustrates on a scale somewhat larger than the scale used in Fig. 1 a suspension trolley system with two carriages in spaced arrangement.

As a part of the method according to the present invention in contrast to the method heretofore used in commercial laundries, the laundry bundle of the individual customer is no longer marked with the name of the customer but all laundry articles of the individual customer bear one and the same number, which number may, for instance, be selected from the numbers 1 to 80. These individual bundles, each of which, as stated above, has one number as belonging to a different person and each of which may contain a plurality of laundry articles, for instance, 80, are made up into a composite bundle and are provided with a further marking, for instance, A, B, C, D, etc. Each composite bundle A, B, etc. represents a section of a laundry day which may, for instance, be washed in 1 to 2 hours.

The marking of the laundry articles and/or the counting of the number of articles pertaining to an individual bundle is preferably effected by means of a stamping machine. Each individual bundle, then, has a marking, for instance, A27/80 in which "A" indicates the composite lot, while the numeral "27" refers to the number of the customer, and the numeral "80" indicates the number of laundry articles.

These composite bundles of, for instance 60 to 80 individual bundles with approximately 3,000 laundry articles which have been marked piece by piece in the manner indicated above, are now sub-divided according to the type of material which can be uniformly treated.

The present invention makes use of this system of numbering and marking. More specifically, the invention consists in the application of endless conveyor belts comprising spaced conveyor plates, for instance, with suspended conveying means, which preferably have a multiple sub-division and are passed by various processing stations to enable further processing of the washed and dried articles in commercial laundries and for sorting of the laundry.

The method of properly distributing the washed and dried laundry articles consists in that the goods are slowly, in a continuous process and by means of spaced conveying means connected to an endless conveyor belt or the like, passed by the various processing stations for further processing the washed and dried goods. Thus, the goods are, for instance, passed by mangles, presses, pressing machines, hand-ironing stations, drying devices, stretching devices and the like and the goods are distributed to these stations and conveyed to distributing racks with mounting mechanisms and deposited for packaging so that the goods are completely sorted and transported to the packaging stations.

Further features of the invention consist in the particular construction and arrangement of the conveying and sorting mechanisms.

The invention affords a far better utilization than heretofore possible of all machines specifically designed for the respective treatment of the different laundry articles. In addition thereto, considerable space will be saved in the laundry plant. Due to the continuous flow of the proper distribution and sorting of the laundry, all useless trips and effort wasted thereby by the operators will be avoided and thus, with the same number of machines and the same personnel, a considerable increase in output will be obtained.

Finally, the laundry, after having been subdivided and sorted, for instance, according to bedsheets, table cloths, underwear, etc., may be treated according to its nature and thus a better, more careful treatment and cleaning will be obtained.

Structural arrangement

According to the present invention, commercial laundries are provided with endless conveyor belts 10 which are equipped with conveyor plates 11 spaced from each other at a predetermined distance. These plates are passed by the various processing stations for further processing the washed and dried laundry. In this way, a simple and economical sorting is effected. As conveyor means there may, for instance, be employed suspension trolley systems 12 which have suspended thereon spaced conveyor means 13 actuated by pulling means 14. These suspended conveying means 13 are provided with a plurality of shelves 15, 15a, 15b arranged one above the other. These conveying means form racks open at both sides.

These conveyor racks are passed by the various individual processing stations for further processing the washed laundry, for instance, by drying devices 16, mangles 17, presses 18, small mangles 19, collar-pressing machines 20, hand-ironing tables 21 and, if desired, also patching tables 22. Naturally, there may also be other processing stations such as stretching stations by which the conveyor belts pass in close proximity.

As mentioned above, the laundry articles have previously been marked accordingly at another station and arrive by means of appropriate conveying means, for instance, carts, at the washing machines for the individual materials and are also moved by carts, or the like, to the centrifuging machines, whereupon they are transported to the individual processing machines such as the machines 16 to 22.

After the laundry articles have been processed by these various processing machines, the operator deposits the respective processed article on one of the conveying racks 13, 15, passing by his station. For instance, he may deposit the goods with the numbers 1 to 10 on the plate or shelf 15 while the shelf 15a may receive the goods with the numbers 11 to 20 and the shelf 15b may receive goods with other numbers. It is, of course, understood that the conveying racks may comprise any number of shelves.

Figure 3:
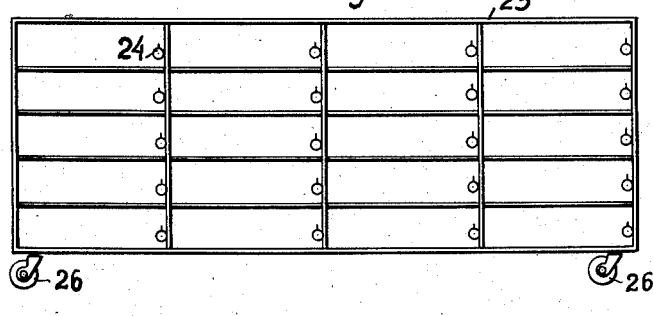
Fig. 3 is a side view of a sorting rack.

The goods thus deposited on the respective shelves of the conveying means move to the depositing stations which are formed by sorting racks 23 as, for instance, shown in Fig. 3. These racks also have a plurality of shelves and are provided with manually operable counting devices 24. When depositing each laundry article delivered to the sorting rack by the conveying rack, the sorter uses the counting device. When all laundry articles pertaining to a composite bundle A, B, etc. have arrived at the sorting station, the laundry articles are removed from the sorting racks by the operator at the packaging table 25. To this end, the sorting racks 23 are arranged between the packaging tables 25 and the suspension trolley system carrying the conveying means. These sorting racks are preferably adjustable, for instance, by means of rollers 26, wheels or the like, and can be moved or turned by an angle of 180°

These sorting racks, if desired, may be sub-divided in vertical direction by a partition so that the packaging operator on one side of the sorting rack can only take off those laundry articles on his side and cannot take off the sorting rack the laundry articles before all laundry articles of one and the same composite bundle have been distributed over the sorting rack. The sorting racks, however, must be open at both sides so that, depending on the position of the sorting rack, the deposited laundry lots will be accessible to the sorting operators as well as to the packaging operators.

The sub-division of the conveying rack into a plurality of shelves or tables 15 to 15b, etc. arranged one above the other makes it possible that at the sorting stations, the sorting operators take off the laundry only from those shelves which are allotted to them. For instance, one sorting operator takes off the laundry articles only from the uppermost shelf (#1 to 10) and deposits the laundry articles into the shelf of the sorting table 23, whereas the next and next following sorting operator handles the second and third shelves, respectively. In this way, each sorting operator has a relatively small working range without having to make unnecessary trips.

If the amount of laundry pieces arriving in successive conveying means and lying on corresponding shelves is too great so that the sorting operator cannot, in time, handle all the work, this will not affect the proper working of the system, inasmuch as the laundry which has not been taken off the respective shelves will continue to be advanced and will be taken off when the respective conveying means returns to the respective sorting station.

Practical tests have proved that the entire composite bundle, for instance, the bundle washed in one washing machine, can be handled in one and one-half hours. With the sorting an automatic counting of each bundle is likewise obtained. It is possible that while at one side of the sorting station the sorting is effected, at the other side of the sorting rack the packaging operator takes off the finished articles, so that he can now package the same and forward the thus packaged articles to the delivery station.

It is advantageous electrically to connect each working station, for instance, mangles, presses, pressing machines and the like, with a signal system visible to all operators of the plant. If, for instance, at one working station handling one composite bundle the work has been completed, a signal may be given by operation of a corresponding switch means and may be made visible at a predetermined point in the plant so as to notify the superintendent accordingly and enable him to control the individual machines and working stations correspondingly.

It is, of course, understood that the present invention is by no means limited to the particular arrangements and constructions shown in the drawing but also comprises any modifications within the scope of the appended claims.

Thus, while in the described example each individual bundle was marked with a symbol, e. g. 27, indicating a specific customer, and with the number of pieces pertaining to the respective individual bundle, e. g. 80, so that the individual bundle was marked for instance 27/80, it is not necessary that the marking contain the number of individual pieces pertaining to the respective individual bundle. Instead a list carrying each customer's symbol and indicating how many and if desired also what type of pieces he has in his individual bundle or bundles may be kept at the sorting station to enable the operator there precisely to check the individual customer's laundry pieces.

What I claim is:

1. A method, particularly for use in commercial laundries, of distributing marked, washed and dried laundry articles for further processing and ultimate packaging, which includes the steps of: placing the marked, washed and dried laundry articles on a plurality of shelves characterized according to the character of work to be done further on the respective laundry articles; passing said shelves in a continuous process in one and the same direction by a plurality of processing stations and at least one sorting and one packaging station; transferring respectively marked laundry articles from the respective shelves to whatever processing station necessary for performing additional work on the respective laundry articles; following the completed work on the respective laundry articles at the respective processing station, returning the thus processed articles to a shelf of a different character from which it was removed; further passing the laundry articles thus returned to the respective shelf to whatever processing stations required for further work to be done on the respective laundry articles; repeating the transfer of the laundry articles from the respective shelves to the respective processing stations and back to shelves of the character corresponding to the additional work to be done on the respective articles until the respective laundry articles have been completely processed; and ultimately transferring the completely processed laundry articles to a sorting station and from there to a packaging station.

2. A method, particularly for use in commercial laundries, of distributing marked, washed and dried laundry articles for further processing and ultimate packaging, which includes the steps of: placing the various laundry articles upon different shelves in conformity with the work still to be done; moving said shelves in a continuous manner in one and the same direction along an endless path; alternately transferring the respective laundry articles from the respective shelves to the respective processing stations and from there to shelves corresponding to the work to be performed at another processing station; continuing this alternate placing on the shelves, transferring the articles from said shelves to the respective processing station, and returning the articles to other shelves for further processing of the respective laundry articles until the respective articles have been completely processed; and finally transferring the completely processed articles to a sorting station and from there to a packaging station for ultimate packaging of the laundry articles.

References Cited in the file of this patent

UNITED STATES PATENTS

| | | |
|---|---|---|
| 937,659 | Todd | Oct. 19, 1909 |
| 1,306,297 | Auerochs | June 10, 1919 |
| 1,350,774 | Braley | Aug. 12, 1920 |
| 1,440,204 | Alschuler | Dec. 26, 1922 |
| 1,454,675 | Gantvoort | May 8, 1923 |
| 1,813,229 | Constable | July 7, 1931 |
| 2,321,870 | Steele | June 15, 1943 |
| 2,359,464 | Carothers | Oct. 3, 1944 |
| 2,426,843 | Phair | Sept. 2, 1947 |